United States Patent
Parikh et al.

(10) Patent No.: US 10,805,358 B2
(45) Date of Patent: Oct. 13, 2020

(54) UNIVERSAL CASTING SERVICE

(71) Applicant: Microsoft Technology Licensing, LLC, Redmond, WA (US)

(72) Inventors: Vaibhav Girish Parikh, Bothell, WA (US); Junyan Lin, Kirkland, WA (US); Paul Valentin Borza, Redmond, WA (US); Brian Thomas Schwartz, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 240 days.

(21) Appl. No.: 15/292,504

(22) Filed: Oct. 13, 2016

(65) Prior Publication Data
US 2018/0109566 A1  Apr. 19, 2018

(51) Int. Cl.
*H04L 29/06* (2006.01)
*H04L 29/08* (2006.01)

(52) U.S. Cl.
CPC ...... *H04L 65/1069* (2013.01); *H04L 65/1089* (2013.01); *H04L 65/1093* (2013.01); *H04L 65/4069* (2013.01); *H04L 65/4076* (2013.01); *H04L 65/605* (2013.01); *H04L 67/025* (2013.01)

(58) Field of Classification Search
CPC . H04L 65/1069; H04L 67/025; H04L 65/605; H04L 65/4076; H04L 65/1093; H04L 65/1089; H04L 65/4069
See application file for complete search history.

(56) References Cited

U.S. PATENT DOCUMENTS

| | | |
|---|---|---|
| 5,583,561 A | 12/1996 | Baker et al. |
| 6,212,566 B1 | 4/2001 | Vanhoof et al. |
| 8,054,294 B2 | 11/2011 | Sakai et al. |
| 9,071,866 B2 | 6/2015 | Mason et al. |
| 9,197,928 B2 | 11/2015 | Goziker et al. |
| 9,338,488 B1* | 5/2016 | Venkataraman ....... H04N 21/24 |
| 2003/0143982 A1* | 7/2003 | Wolters ............... H04L 12/1859 455/414.1 |
| 2010/0011135 A1* | 1/2010 | Jawa ................... H04L 67/1095 710/19 |
| 2010/0079670 A1 | 4/2010 | Frazier et al. |

(Continued)

FOREIGN PATENT DOCUMENTS

| | | |
|---|---|---|
| WO | 2015145421 A1 | 10/2015 |
| WO | 2015200507 A1 | 12/2015 |

OTHER PUBLICATIONS

How to use Miracast Screen Mirroring from windows or androidby Chris Hoffman, retrieved from https://www.howtogeek.com/200897/how-to-use-miracast-screen-mirroring-from-windows-or-android/ (Year: 2016).*

(Continued)

*Primary Examiner* — Michael A Keller (57) ABSTRACT

A method for operating a universal casting service is described. The method receives a casting request from a first client; initiates a first casting session to a first casting device; establishes a first queue for the first casting device; adds a first media item to the queue from the first client; receives a casting request from a second client; and adds a second media item to the first queue from the second client.

20 Claims, 6 Drawing Sheets

(56) References Cited

U.S. PATENT DOCUMENTS

| | | | | |
|---|---|---|---|---|
| 2013/0282820 | A1* | 10/2013 | Jabri | H04L 65/403 709/204 |
| 2014/0344689 | A1 | 11/2014 | Scott et al. | |
| 2014/0365611 | A1* | 12/2014 | Praveenkumar | H04L 69/24 709/219 |
| 2015/0355879 | A1* | 12/2015 | Beckhardt | H04L 65/60 700/94 |
| 2015/0373069 | A1* | 12/2015 | Rajapakse | H04L 65/4076 709/219 |
| 2016/0255121 | A1 | 9/2016 | Mcrae | |
| 2016/0270145 | A1* | 9/2016 | Srinivasa Gopalan | H04L 67/16 |
| 2016/0337425 | A1* | 11/2016 | Medaghri Alaoui | G06F 16/438 |
| 2018/0262792 | A1* | 9/2018 | Mackay | H04N 21/4302 |

OTHER PUBLICATIONS

"International Search Report and Written Opinion Issued in PCT Application No. PCT/US2017/055455", dated Jan. 4, 2018, 12 Pages.

"EZCast", https://play.google.com/store/apps/details?id=com.actionsmicro.ezcast, Published on: Sep. 30, 2016, 4 pages.

Anderson, Kareem, "Tubecast developers create new Windows 10 Universal casting app, Playcast", http://www.winbeta.org/news/tubecast-developers-create-new-windows-10-universal-casting-app-playcast, Published on: Dec. 30, 2015, 8 pages.

"Web Video Cast | Browser to TV", https://play.google.com/store/apps/details?id=com.instantbits.cast.webvideo, Published on: Sep. 5, 2016, 4 pages.

"Media casting", https://msdn.microsoft.com/en-us/windows/uwp/audio-video-camera/media-casting, Published on: Sep. 19, 2016, 11 pages.

* cited by examiner

UNIVERSAL CASTING SERVICE

BACKGROUND

In the past few years there has been a surge in smart devices. One specific segment of such connected devices is casting devices. These casting devices allow displays or speakers to be controlled remotely from, for example, a phone, tablet, or laptop. For example, Google Chromecast Audio allows an Android phone to connect to it and control the speakers present in the living room, so the owner of the house can decide on a playlist, for example, during a housewarming party.

Today, people can cast media via various casting receivers or smart devices provided by different companies like Google Chromecast, Amazon Fire Stick, Microsoft Miracast, Samsung smart devices, Apple CarPlay, and Android Auto. However, the application or the operating system that the user is using must implement casting protocols for specific casting receivers. For example, a user may try to cast a video from the YouTube application on his iPhone to his television via an Amazon Fire Stick, but she won't be able to do that, because this YouTube app has only implemented the casting feature for Google Chromecast. Or one user may try to cast media via Chromecast, but since another user is already connected to that same Chromecast device, and since YouTube on Chromecast doesn't support multiple simultaneous users, he won't be able to do that. The problem is that all these casting receivers are designed by different companies for usage by a single client, which results in a lack of coordination between individual receivers from same or different companies.

SUMMARY

Non-limiting examples of the present disclosure describe a method of using a universal casting service. The method receives a casting request from a first client; initiates a first casting session to a first casting device; establishes a first queue for the first casting device; adds media to the first queue from the first client; receives a casting request from a second client; and adds media to the first queue from the second client.

Further non-limiting examples of the present disclosure describe a universal casting system. The system includes at least one processor; and a memory operatively connected with the at least one processor storing computer-executable instructions that, when executed by the at least one processor, causes the at least one processor to execute a method. The method includes: receiving a first casting request from a first client; initiating a first casting session to a first casting device; establishing a first queue for the first casting device; receiving a second casting request from a first client; initiating a second casting session to a second casting device; and establishing a second queue for the second casting device.

Further non-limiting examples of the present disclosure describe a non-transitory machine readable storage medium having stored thereon a computer program, the computer program comprising a routine of set instructions for causing the machine to perform the operations of: receiving a session request from a first client device; creating a session with a GUID with a first casting device; receiving a request to join the session from a second client device; adding the second client device to the session; receiving a first media item from the first client device; receiving a second media item from the second client device; and adding the first media item and the second media item to a first queue for the first casting device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Examples disclosed herein describe systems and methods for a universal casting service. In order to overcome the problem of only permitting a single device at a time to access a casting receiver, the disclosure introduces the notion of a Universal Casting Service (UCS) which acts as a broker between a casting client and a casting receiver. This in turn allows multiple users to collaboratively control the actions taken by the casting receiver. For example, UCS will allow everyone at the party to queue up different songs, not only the host of the party. This kind of behavior is more likely to be agreed upon by friends where each takes turn in deciding which song is played next.

While the bulk of the examples in this disclosure center around the idea of a playlist, for example a queue of songs, other collaborative casting experiences are also enabled by the UCS. For example, a picture editing casting session may be created where a plurality of users make edits to an image. For example, user A may add ornaments; user B may add a hat; and user C may add sunglasses. Any types of media items may be the subject of a casting session.

Furthermore, UCS unifies the various communication protocols employed by different hardware manufacturers. When referring to hardware, the system is capable of handling not only TVs and speakers across casting devices like Google Chromecast, Amazon Fire stick, Roku, but also more advanced devices like refrigerators or even cars. Designed as a layer on top of various casting APIs, UCS maintains collaborative casting sessions across devices and users; similar to chat rooms/groups, casting sessions can be considered to be "casting rooms/groups."

UCS makes a single platform that is able to handle complex casting scenarios while supporting a diverse set of casting communication protocols. The UCS acts as an imposter layer by abstracting away scenario-specific information and requirements into a single channel of communication that may be between any number of client devices and receivers and that is independent from the original casting communication protocol following a brief setup period.

The modern casting environment has a diverse set of communication protocols between client devices and receivers. These casting protocols allow for structured messages to be sent between the client and the receivers. However, for complex casting scenarios these restrictive protocols heavily restrict the feature set. In addition to these structured message streams, casting protocols often allow for the exchange of unstructured strings. At a high level, the receiver's communication protocols can be divided into two sets of protocols; ones that allow for bilateral communication of unstructured strings and ones that allow for only unilateral direction communication of unstructured strings (from client to receiver). In the event of the protocol only allowing for the unilateral communication, UCS creates an artificial bilateral method of communication through the UCS to allow for the development of these complex casting scenarios on receivers that would otherwise be unable to support bilateral communications.

Another restriction imposed by some communication protocols is the requirement of having only one client device paired to the receiver at a time. To work around this one-to-one mapping restriction, UCS uses one device to establish the connection between the client<->UCS and UCS<->receiver and then uses the UCS to manage the connection of multiple client devices. This allows us to support multicast scenarios regardless of the casting communication protocol's capabilities or requirements to establish a connection.

The UCS provides for more efficient use of casting devices in that multiple users can use a single casting device; furthermore, a single user can simultaneously and synchronously use multiple casting devices. By permitting multiple users to access a single casting device simultaneously this also provides for more efficient use of limited casting device resources. The user interface and experience is also dramatically improved through the use of a UCS. In prior art system, when a user is playing media on a casting device and a second user interrupts to take over the use of the casting device, the first user has no notice of what has happened and is simply disconnected from the casting device. The UCS provides for updating of each user's view of the play queue as users come and go and items are added or deleted from the play queue. A lot of the mystery of the existing one-to-one limitation system is eliminated.

Figure 3:
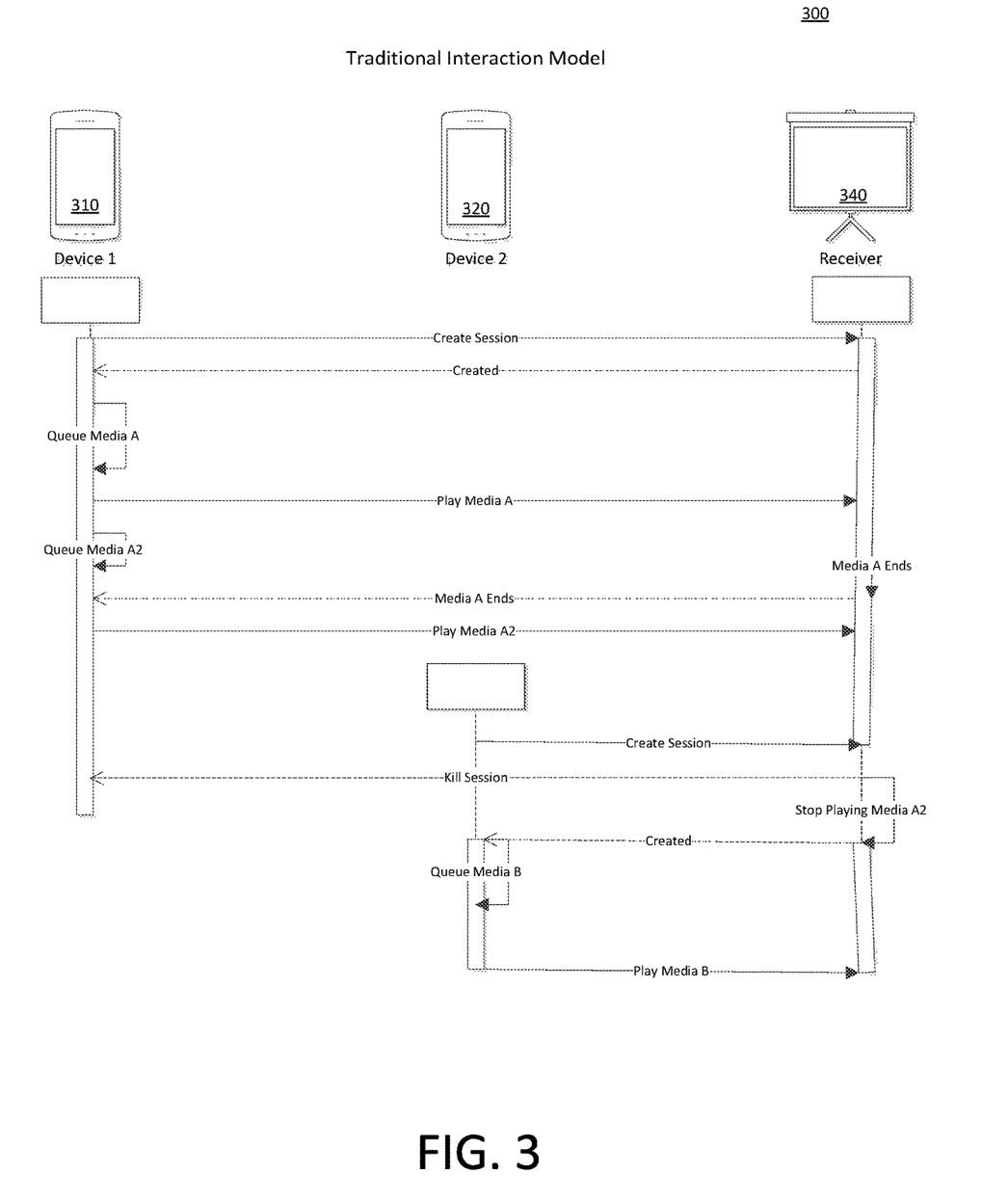
FIG. 3 is a flow diagram illustrating an exemplary session of a prior art casting service.

FIG. 3 is a flow diagram illustrating an exemplary session of a casting service that illustrates the limitations of the one-to-one mapping restrictions currently available. The figure illustrates a system in which two cast clients, Device 1 310 and Device 2 320, cast to a cast receiver 340. Initially, cast client Device 1 310 creates a session between Device 1 310 and cast receiver 340. The receiver returns a message noting that the session has been created. Assuming that the user of Device 1 310 is playing media, Media A is queued and played on cast receiver 340; then, Media A2 may be queued, and following play of Media A, Media A2 is played on cast receiver 340. When a user of Device 2 320 wants to play media on cast receiver 340, Device 2 320 creates a session on cast receiver 340. The creation of this new session from Device 2 320 causes the cast receiver to send a message to Device 1 310 that notifies Device 1 310 that its session with cast receiver 340 has been killed, and Media A2 will stop playing on cast receiver 340. Then the user of Device 2 320 queues up Media B which is then played on cast receiver 340. So, one can see that multiple devices cannot simultaneously use cast receiver 340 in a cooperative fashion.

Figure 1:
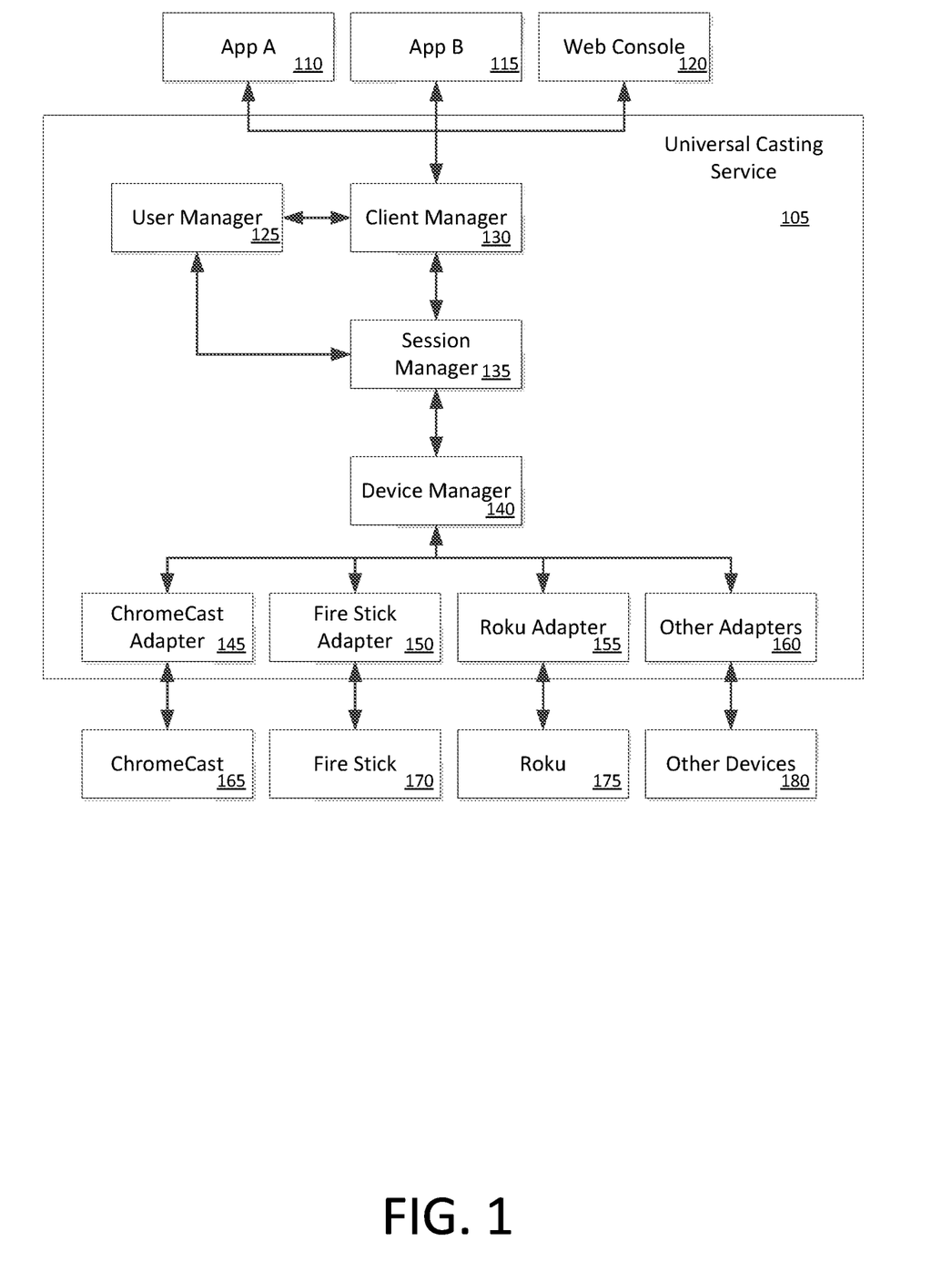
FIG. 1 is a block diagram illustrating an exemplary system for a universal casting service in which aspects of the present disclosure may be practiced.

FIG. 1 is a block diagram illustrating an exemplary system for a universal casting service in which aspects of the present disclosure may be practiced. In the figure, one or more client devices have one or more applications, such as App A 110, App B 115, and Web Console 120, that are in communication with a Universal Casting Service 105 that acts as a mediator or imposter layer between the client devices and one or more casting services, such as ChromeCast 165, Fire Stick 170, Roku 175, or Other Devices 180. The Universal Casting Service 105 typically resides in the cloud for ease of access, for example, removing the necessity of logging into a party host's WiFi network to access the UCS; however, the UCS may also reside locally, for example, in a router or other network device present at a host's location.

Within the Universal Casting Service, the following functions may be present. A Client Manager 130 may serve as the interface to the applications, App A 110, App B 115, and Web Console 120. The Client Manager 130 may also manage the communications with the applications on the various casting clients. A User Manager 125 in communication with the Client Manager 130 will manage the connections to various users. A single user may be using multiple clients. A Session Manager 135 manages each of the sessions between applications on the casting clients and the various casting devices. The Session Manager 135 is in communication with the Client Manager 130 and the User Manager 125, in addition to being in communication with a Device Manager 140. Session Manager 135 serves as a central part of the UCS in that it manages each of the sessions, the state of each of the sessions, playlists, and play state, as well as other features such as to-do lists that may be used by certain smart appliances for example, as well as for providing intelligent recommendations of, for example, music, playlists, appointments, or to-dos.

Device Manager 140 is responsible for managing the connections with the various casting devices via casting device adapters. For example, when communicating with a ChromeCast 165, Device Manager 140 communicates to the ChromeCast 165 via ChromeCast Adapter 145. Communication to Fire Sticks 170, Rokus 175, and Other Devices 180 occur via comparable respective Fire Stick Adapters 150, Roku Adapters 155, and Other Adapters 160.

Figure 2:
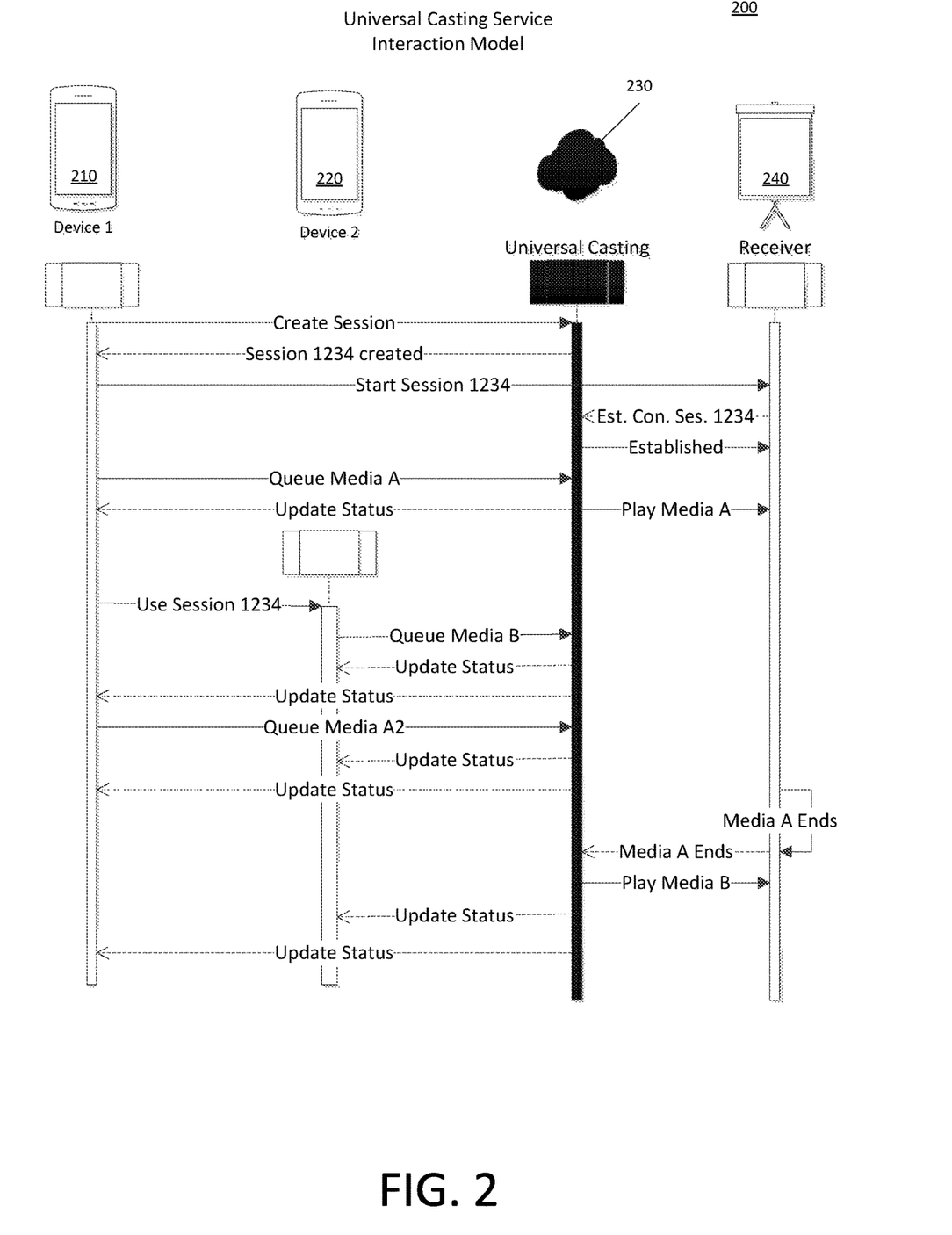
FIG. 2 is a flow diagram illustrating an exemplary session of a universal casting system in which aspects of the present disclosure may be practiced.

FIG. 2 is a flow diagram illustrating an exemplary session of a universal casting system in which aspects of the present disclosure may be practiced. Through this figure, one can see the functions of various parts of the Universal Casting Service and how the UCS plays the function of an imposter layer. In this exemplary figure, two casting clients Device 1 210 and Device 2 220 communicate via a UCS 230 with a casting device Receiver 240. When Device 1 210 detects a casting device that is compatible with the UCS 230, Device 1 210 creates a session with UCS 230. UCS 230 responds with a message that a session with a globally unique identifier or GUID, such as 1234, has been created. This mimics a bilateral communication casting protocol, but can be established regardless of whether Receiver 240 has this bilateral communication ability. Device 1 210 then sends a message to Receiver 240 to start session 1234. Receiver 240 then sends a message to the UCS to establish connection session 1234 and UCS responds with a message that the connection session 1234 has been established. Thus, a two-way communication channel is established, regardless of whether the Receiver 240 has this ability.

A user of Device 1 210 may then queue Media A, for example, to play on Receiver 240 by sending a message to UCS 230 to Queue media A. Following this, two messages are sent from the UCS: a first message is sent to Receiver 240 to Play Media A; and a second message is sent to Device 1 210 that provides a status update to Device 1 210. When Device 2 220 wants to attach to Receiver 240 it comes online and is informed to also use Session 1234. Device 2 220 may then send a message to UCS 230 to Queue Media B. UCS 230 then updates the status of the Receiver 240 (i.e. a playlist update) to both Device 1 210 and Device 2 220. Thus, there is no session loss to Device 1 210 when Device 2 comes on-line. As session state is maintained by the Session Manager 135 of the UCS 105, there is no loss of data when adding or removing clients or casting devices. Thus, users can switch which receiver they want to target and allow which clients to be able to view or change the shared state of the session in a seamless manner. Restrictions imposed by casting communication protocols of certain casting devices are lifted.

When the play of Media A ends at Receiver 240 a message is sent that Media A Ends to UCS 230 from Receiver 240. UCS 230 then looks at its playlist and instructs Receiver 240 to Play Media B. The UCS then updates both Device 2 220 and Device 1 210 of the status of Receiver 240, notably that Media B is being played on Receiver 240.

By creating this imposter layer at the UCS, many different functions are possible. For example, multiple casting devices may simultaneously play music and/or video simultaneously and in sync. In this scenario the Session Manager 135 ensures that the multiple casting devices remain in sync. In contrast to prior art one-to-one casting systems, UCS only needs one client to initialize the connection to the casting device and then UCS will act as that user when interacting with the receiver. A casting session is created on UCS, and UCS maintains the two way sync with the casting device. Multiple users can interact with the same casting session on UCS to, for example, insert a song, change the order of play, delete songs from the list, or change the playlist entirely. Similarly, multiple users can interact with the same casting session on UCS to, for example, submit alterations to an image which is the subject of a casting session and each of the users would see the edits to the image as they occur. UCS maintains the two way sync with the casting device or devices, so from the perspective of the casting device there is one client.

In addition, the UCS allows the creating of a continuous casting queue with content coming from different sources. For example, a playlist may have music from Spotify and locally stored music in the same queue. Users can add content from a variety of sources to the session.

Furthermore, usually in order to connect and use a casting device, a client has to be on the same Wi-Fi network as the casting device, which adds complexity to cast when a user is at an unfamiliar location. Since UCS handles all the communication between a user and one or more casting devices, the client doesn't need to be aware of the casting device, and vice versa. Only one user needs to be on the Wi-Fi network to establish the initial connection from UCS to a casting device. Once a UCS cast session is created, UCS may generate a secure link as the web console of this session. Any user with internet access can connect to the session as a guest now, where users can add, remove, or re-order the cast contents in the session on UCS. These interactions are between user clients and UCS. And, UCS imposes as a single user to maintain the connection to casting device(s) and passes down the commands.

UCS implements connectivity to casting receivers as adapter plugins, which makes it easily extendable. As technology is developing, more and more smart devices are launched, like appliances and cars. With the extensible design, UCS can potentially broaden its support to all sorts of smart devices and act as a universal remote control for them.

Figure 4:
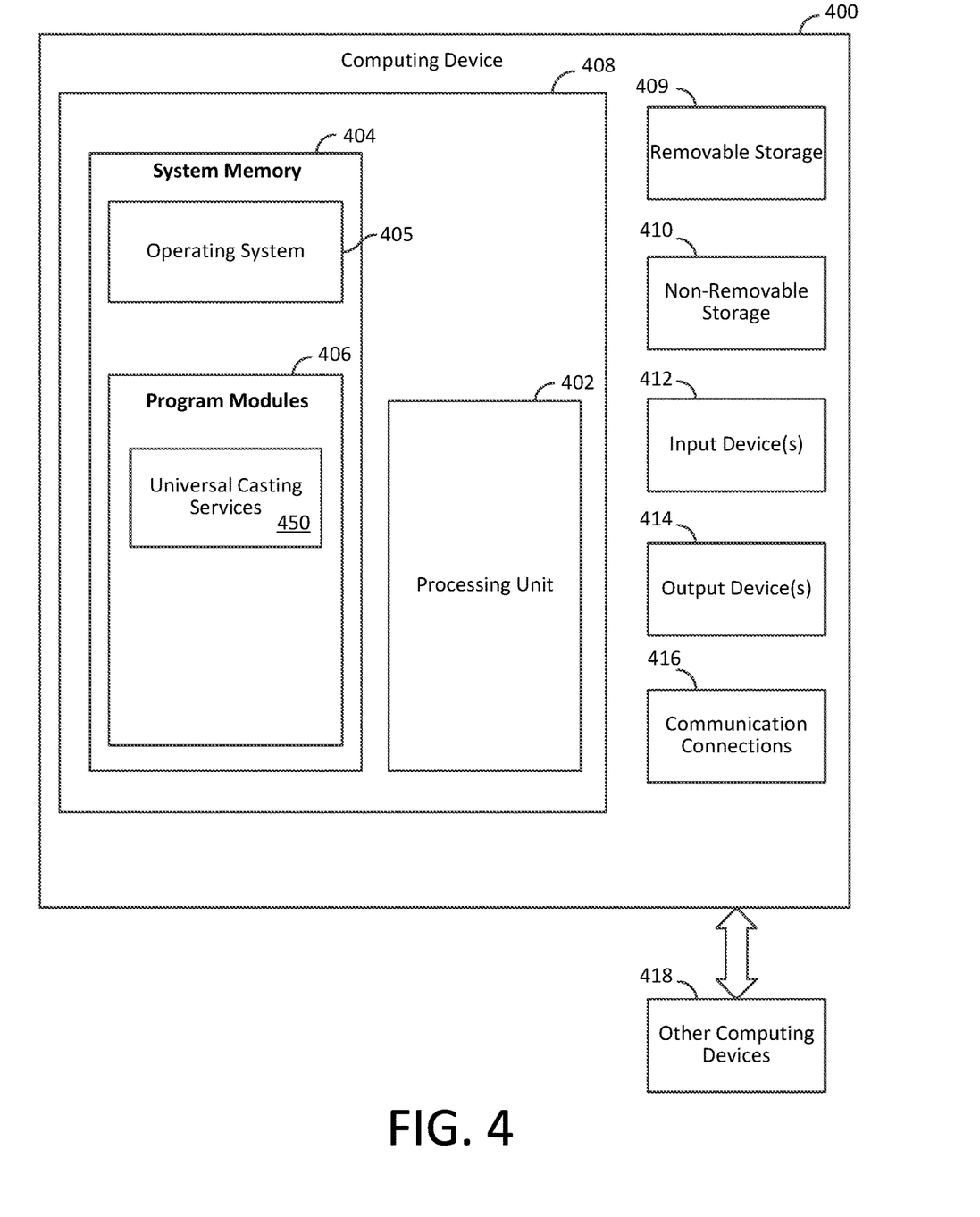
FIG. 4 is a block diagram illustrating example physical components of a computing device with which aspects of the disclosure may be practiced.
Figure 5A:
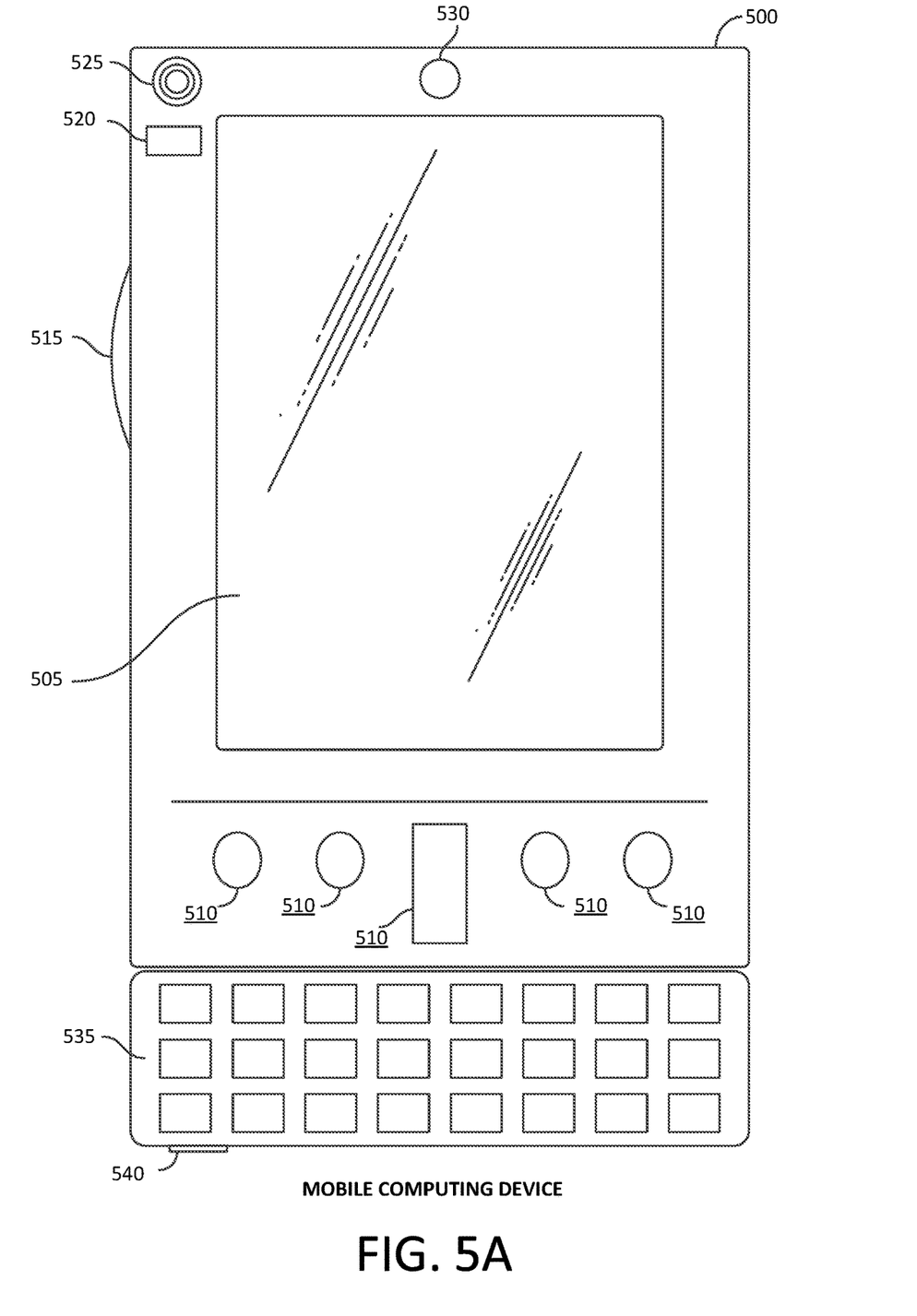
FIGS. 5A and 5B are simplified block diagrams of a mobile computing device with which aspects of the present disclosure may be practiced.
Figure 5B:
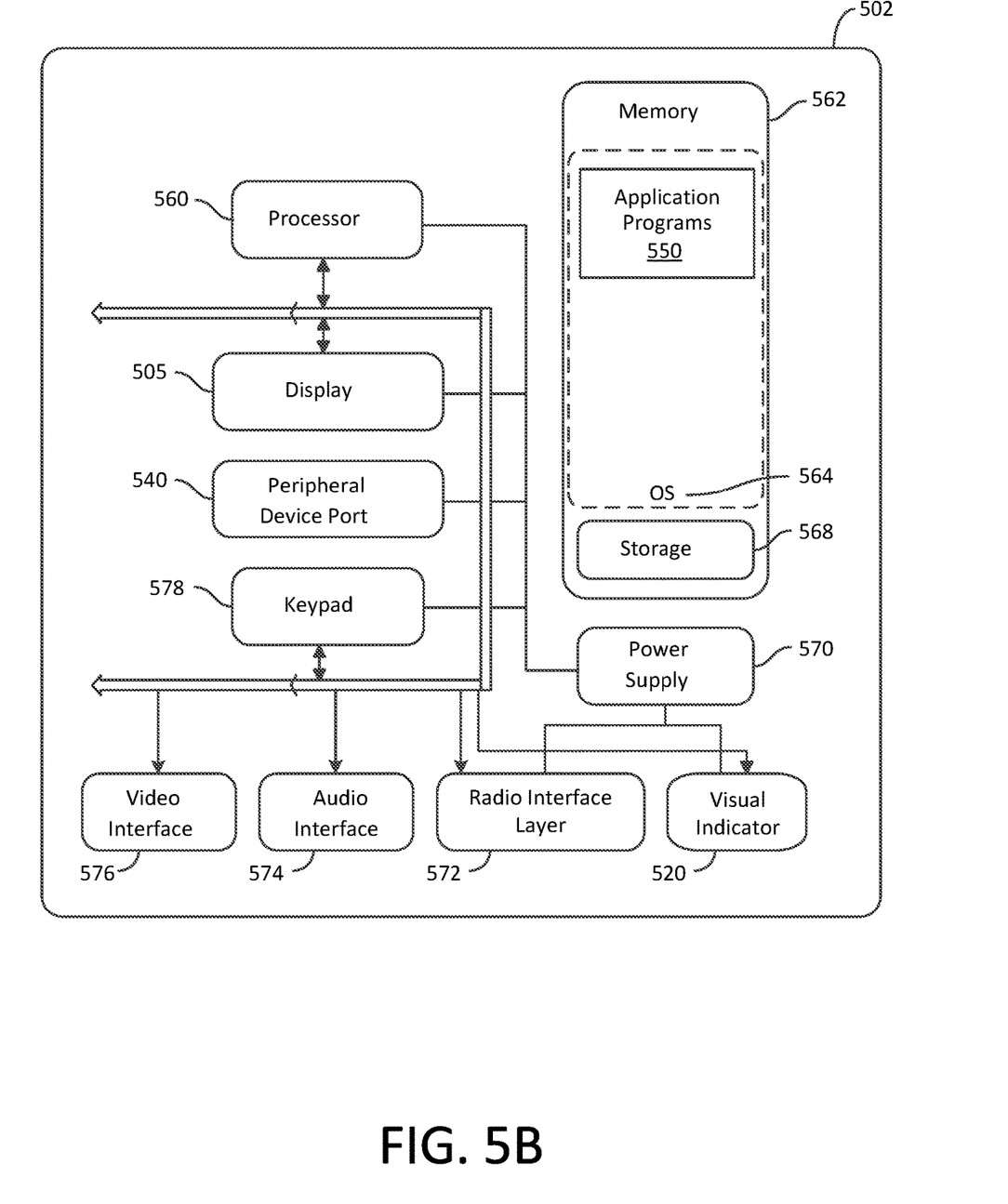

FIGS. 4-5 and the associated descriptions provide a discussion of a variety of operating environments in which aspects of the disclosure may be practiced. However, the devices and systems illustrated and discussed with respect to FIGS. 4-5 are for purposes of example and illustration and are not limiting of a vast number of computing device configurations that may be utilized for practicing aspects of the disclosure, as described herein.

FIG. 4 is a block diagram illustrating physical components (e.g., hardware) of a computing device 400 with which aspects of the disclosure may be practiced. The computing device components described below may have computer executable instructions for implementing a universal casting system 450 on a computing device, including computer executable instructions that can be executed to implement the methods disclosed herein. In a basic configuration, the computing device 400 may include at least one processing unit 402 and a system memory 404. Depending on the configuration and type of computing device, the system memory 404 may comprise, but is not limited to, volatile storage (e.g., random access memory), non-volatile storage (e.g., read-only memory), flash memory, or any combination of such memories. The system memory 404 may include an operating system 405 and one or more program modules 406 suitable for running queue analysis application 450.

The operating system 405, for example, may be suitable for controlling the operation of the computing device 400. Furthermore, embodiments of the disclosure may be practiced in conjunction with a graphics library, other operating systems, or any other application program and is not limited to any particular application or system. This basic configuration is illustrated in FIG. 4 by those components within a dashed line 408. The computing device 400 may have additional features or functionality. For example, the computing device 400 may also include additional data storage devices (removable and/or non-removable) such as, for example, magnetic disks, optical disks, or tape. Such additional storage is illustrated in FIG. 4 by a removable storage device 409 and a non-removable storage device 410.

As stated above, a number of program modules and data files may be stored in the system memory 404. While executing on the processing unit 402, the program modules 406 (e.g., universal casting system 450) may perform processes including, but not limited to, the aspects, as described herein. Other program modules that may be used in accordance with aspects of the present disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 4 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 400 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 400 may also have one or more input device(s) 412 such as a keyboard, a mouse, a pen, a sound or voice input device, a touch or swipe input device, etc. The output device(s) 414 such as a display, speakers, a printer, etc. may also be included. The aforementioned devices are examples and others may be used. The computing device 400 may include one or more communication connections 416 allowing communications with other computing devices 418. Examples of suitable communication connections 416 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 404, the removable storage device 409, and the non-removable storage device 410 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 400. Any such computer storage media may be part of the computing device 400. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 5A and 5B illustrate a mobile computing device 500, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 5A, one aspect of a mobile computing device 500 for implementing the aspects is illustrated. In a basic configuration, the mobile computing device 500 is a handheld computer having both input elements and output elements. The mobile computing device 500 typically includes a display 505 and one or more input buttons 510 that allow the user to enter information into the mobile computing device 500. The display 505 of the mobile computing device 500 may also function as an input device (e.g., a touch screen display). If included, an optional side input element 515 allows further user input. The side input element 515 may be a rotary switch, a button, or any other type of manual input element. In alternative aspects, mobile computing device 500 may incorporate more or less input elements. For example, the display 505 may not be a touch screen in some embodiments. In yet another alternative embodiment, the mobile computing device 500 is a portable phone system, such as a cellular phone. The mobile computing device 500 may also include an optional keypad 535. Optional keypad 535 may be a physical keypad or a "soft" keypad generated on the touch screen display. In various embodiments, the output elements include the display 505 for showing a graphical user interface (GUI), a visual indicator 520 (e.g., a light emitting diode), and/or an audio transducer 525 (e.g., a speaker). In some aspects, the mobile computing device 500 incorporates a vibration transducer for providing the user with tactile feedback. In yet another aspect, the mobile computing device 500 incorporates input and/or output ports, such as an audio input (e.g., a microphone jack), an audio output (e.g., a headphone jack), and a video output (e.g., a HDMI port) for sending signals to or receiving signals from an external device.

FIG. 5B is a block diagram illustrating the architecture of one aspect of a mobile computing device. That is, the mobile computing device 500 can incorporate a system (e.g., an architecture) 502 to implement some aspects. In one embodiment, the system 502 is implemented as a "smart phone" capable of running one or more applications (e.g., browser, e-mail, calendaring, contact managers, messaging clients, games, and media clients/players). In some aspects, the system 502 is integrated as a computing device, such as an integrated personal digital assistant (PDA) and wireless phone.

One or more application programs may be loaded into the memory 562 and run on or in association with the operating system 564. Examples of the application programs include phone dialer programs, e-mail programs, personal information management (PIM) programs, word processing programs, spreadsheet programs, Internet browser programs, messaging programs, the universal casting system and so forth. The system 502 also includes a non-volatile storage area 568 within the memory 562. The non-volatile storage area 568 may be used to store persistent information that should not be lost if the system 502 is powered down. The application programs may use and store information in the non-volatile storage area 568, such as email or other messages used by an email application, and the like. A synchronization application (not shown) also resides on the system 502 and is programmed to interact with a corresponding synchronization application resident on a host computer to keep the information stored in the non-volatile storage area 568 synchronized with corresponding information stored at the host computer. As should be appreciated, other applications may be loaded into the memory 562 and run on the mobile computing device 500, including the instructions for providing a queue analysis application.

The system 502 has a power supply 570, which may be implemented as one or more batteries. The power supply 570 may further include an external power source, such as an AC adapter or a powered docking cradle that supplements or recharges the batteries.

The system 502 may also include a radio interface layer 572 that performs the function of transmitting and receiving radio frequency communications. The radio interface layer 572 facilitates wireless connectivity between the system 502 and the "outside world," via a communications carrier or service provider. Transmissions to and from the radio interface layer 572 are conducted under control of the operating system 564. In other words, communications received by the radio interface layer 572 may be disseminated to the application programs via the operating system 564, and vice versa.

The visual indicator 520 may be used to provide visual notifications, and/or an audio interface 574 may be used for producing audible notifications via an audio transducer 525 (e.g., audio transducer 525 illustrated in FIG. 5A). In the illustrated embodiment, the visual indicator 520 is a light emitting diode (LED) and the audio transducer 525 may be a speaker. These devices may be directly coupled to the power supply 570 so that when activated, they remain on for a duration dictated by the notification mechanism even though the processor 560 and other components might shut down for conserving battery power. The LED may be programmed to remain on indefinitely until the user takes action to indicate the powered-on status of the device. The audio interface 574 is used to provide audible signals to and receive audible signals from the user. For example, in addition to being coupled to the audio transducer 525, the audio interface 574 may also be coupled to a microphone to receive audible input, such as to facilitate a telephone conversation. In accordance with embodiments of the present disclosure, the microphone may also serve as an audio sensor to facilitate control of notifications, as will be described below. The system 502 may further include a video interface 576 that enables an operation of peripheral device 530 (e.g., on-board camera) to record still images, video stream, and the like.

A mobile computing device 500 implementing the system 502 may have additional features or functionality. For example, the mobile computing device 500 may also include additional data storage devices (removable and/or non-removable) such as, magnetic disks, optical disks, or tape. Such additional storage is illustrated in FIG. 5B by the non-volatile storage area 568.

Data/information generated or captured by the mobile computing device 500 and stored via the system 502 may be stored locally on the mobile computing device 500, as described above, or the data may be stored on any number of storage media that may be accessed by the device via the radio interface layer 572 or via a wired connection between the mobile computing device 500 and a separate computing device associated with the mobile computing device 500, for example, a server computer in a distributed computing network, such as the Internet. As should be appreciated such data/information may be accessed via the mobile computing device 500 via the radio interface layer 572 or via a distributed computing network. Similarly, such data/information may be readily transferred between computing devices for storage and use according to well-known data/information transfer and storage means, including electronic mail and collaborative data/information sharing systems.

As should be appreciated, FIGS. 5A and 5B are described for purposes of illustrating the present methods and systems and are not intended to limit the disclosure to a particular sequence of steps or a particular combination of hardware or software components.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method, comprising:
   receiving, at a first local casting device and over a communication protocol, a first casting request from a first local client computing device;
   initiating a first casting session with the first local casting device;
   establishing a first queue for the first local casting device in response to receiving a first media item from the first local client computing device, the first media item from a first source;
   during the first casting session, receiving, at the first local casting device and over the communication protocol, a second casting request from a second local client computing device, the second casting request including a second media item from a second source;
   in response to receiving the second media item from the second local client computing device, adding the second media item to the first queue such that the first local casting device receives content from two different computing devices during a single casting session; and
   during the first casting session, casting the second media item after casting the first media item.

2. The method of claim 1, further comprising initiating a second casting session to a second local casting device.

3. The method of claim 2, further comprising sending the first media item to the first local casting device and the second local casting device.

4. The method of claim 3, further comprising synchronizing a playing of the first media item on the first local casting device and a playing of the first media item on the second local casting device.

5. The method of claim 1, further comprising:
   receiving a third casting request from the first local client computing device;

initiating a second casting session to a second local casting device;

establishing a second queue for the second local casting device; and adding a third media item to the second queue for the second local casting device from the first local client computing device.

6. The method of claim 1, further comprising:

receiving a third casting request from a third local client computing device;

initiating a second casting session to a second local casting device;

establishing a second queue for the second local casting device; and adding a third media item to the second queue for the second local casting device from the third local client computing device.

7. A system, comprising:

at least one processor; and a memory operatively connected with the at least one processor and storing computer-executable instructions that, when executed by the at least one processor, causes the at least one processor to execute a method, comprising:

receiving, at a first local casting device and over a communication protocol, a first casting request from a first local client computing device;

initiating a first casting session with the first local casting device;

establishing a first queue for the first local casting device in response to receiving a first media item from the first local client computing device, the first media item from a first source;

during the first casting session, receiving, at the first local casting device and over the communication protocol a second casting request from a second local client computing device, the second casting request including a second media item from a second source;

in response to receiving a second media item from the second local client computing device, adding the second media item to the first queue such that the first local casting device receives content from two different computing devices during a single casting session; and during the first casting session, casting the second media item after casting the first media item.

8. The method of claim 1, further comprising providing media playback status information to one or more of the first local client computing device and the second local client computing device in response to receiving the second media item.

9. The system of claim 7, further comprising instructions for receiving a third casting request from a third local client computing device to cast to the first local casting device.

10. The system of claim 9, further comprising instructions for adding a first media item from the third local client computing device to the first queue.

11. The system of claim 7, further comprising instructions for playing the first media item on the first local casting device.

12. The system of claim 7, further comprising instructions for updating a status of the first local client computing device and the second local client computing device.

13. The system of claim 7, further comprising instructions for playing the first media item on the first local casting device and transmitting the second media item to a second local casting device.

14. The system of claim 7, further comprising instructions for providing media playback status information to one or more of the first local client computing device and the second local client computing device in response to receiving the second media item.

15. A method, comprising:

receiving, at a first local casting device, a session request from a first local computing device;

creating a session having a globally unique identifier;

associating the session with the first local casting device;

receiving, from a second local computing device, a request to join the session;

adding the second local computing device to the session such that the first local casting device and the second local casting device are simultaneously associated with the session;

receiving a first media item from a first source from the first local computing device;

receiving a second media item from a second source from the second local computing device;

adding the first media item and the second media item to a first queue for the first local casting device; and during the session, casting the second media item after casting the first media item.

16. The method of claim 15, further comprising receiving a session request from the first local computing device for a second local casting device.

17. The method of claim 16, further comprising creating a second session with a globally unique identifier with the second local casting device.

18. The method of claim 17, further comprising receiving a third media item from the first local computing device for the second local casting device.

19. The method of claim 18, further comprising adding the third media item to a second queue for the second local casting device.

20. The method of claim 15, further comprising providing media playback status information to one or more of the first local computing device and the second local computing device in response to receiving the second media item.

* * * * *